United States Patent
Fujii et al.

(10) Patent No.: US 7,792,066 B2
(45) Date of Patent: Sep. 7, 2010

(54) WIRELESS WAKE-ON-LAN POWER MANAGEMENT

(75) Inventors: Kazuo Fujii, Yokohama (JP); Naotaka Katoh, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1573 days.

(21) Appl. No.: 10/874,683

(22) Filed: Jun. 23, 2004

(65) Prior Publication Data

US 2005/0047356 A1    Mar. 3, 2005

(30) Foreign Application Priority Data

Jun. 25, 2003    (JP)    ............... 2003-181653

(51) Int. Cl.
*G08C 17/00*    (2006.01)
*H04M 1/00*    (2006.01)

(52) U.S. Cl. ..................... 370/311; 455/574

(58) Field of Classification Search ............. 370/311, 370/338, 127.1, 127.5, 343.1, 343.2, 343.5, 370/343.6; 455/574, 127.1, 127.5, 343.1, 455/343.2, 343.5, 343.6
See application file for complete search history.

(56) References Cited

U.S. PATENT DOCUMENTS

| | | | | |
|---|---|---|---|---|
| 6,067,297 A * | 5/2000 | Beach | ................ | 370/389 |
| 6,098,100 A * | 8/2000 | Wey et al. | ................ | 709/223 |
| 6,215,764 B1 * | 4/2001 | Wey et al. | ................ | 370/216 |
| 6,363,267 B1 * | 3/2002 | Lindskog et al. | ........... | 455/574 |
| 6,526,507 B1 * | 2/2003 | Cromer et al. | ............ | 713/162 |
| 6,697,383 B1 * | 2/2004 | Li et al. | ................ | 370/510 |
| 6,791,962 B2 * | 9/2004 | Wentink | ................ | 370/338 |
| 6,791,997 B2 * | 9/2004 | Beyer et al. | ............ | 370/447 |
| 6,856,603 B1 * | 2/2005 | Vollmer et al. | ............ | 370/311 |
| 6,920,342 B2 * | 7/2005 | Reiner | ................ | 455/574 |
| 6,985,969 B1 * | 1/2006 | Cheng | ................ | 709/250 |
| 7,031,274 B2 * | 4/2006 | Sherman | ................ | 370/321 |
| 7,103,344 B2 * | 9/2006 | Menard | ................ | 455/343.2 |
| 7,110,783 B2 * | 9/2006 | Bahl et al. | ............ | 455/516 |
| 7,142,896 B2 * | 11/2006 | Lee | ................ | 455/574 |
| 7,155,167 B1 * | 12/2006 | Carty | ................ | 455/67.11 |
| 7,251,232 B1 * | 7/2007 | Meier | ................ | 370/338 |
| 7,283,505 B1 * | 10/2007 | Meenan et al. | ............ | 370/338 |
| 2002/0022455 A1 * | 2/2002 | Salokannel et al. | ........... | 455/68 |

(Continued)

FOREIGN PATENT DOCUMENTS

JP    2000-099414    4/2000

(Continued)

OTHER PUBLICATIONS

Cromer, D.C. et al, "Method and System for Performing Remote Maintenance Operations on a Battery Powered Computer," U.S. Appl. No. 10/727,865, Dec. 4, 2003.

*Primary Examiner*—George Eng
*Assistant Examiner*—Christopher M Brandt

(57)    ABSTRACT

In a wireless LAN mini PCI module connected to a computer, an RF module receives through an antenna a broadcast frame and/or a multicast frame transmitted from a predetermined wireless access point in a state where a main power supply for a system main unit is not on, a magic packet included in the broadcast frame and/or the multicast frame is recognized, and a signal for turning on the main power supply is output from a base band processor to the system main unit.

21 Claims, 7 Drawing Sheets

U.S. PATENT DOCUMENTS

| | | | |
|---|---|---|---|
| 2002/0032855 A1* | 3/2002 | Neves et al. | 713/154 |
| 2002/0118664 A1* | 8/2002 | Ishibashi et al. | 370/338 |
| 2002/0132603 A1* | 9/2002 | Lindskog et al. | 455/343 |
| 2003/0023761 A1* | 1/2003 | Jeansonne et al. | 709/250 |
| 2003/0058843 A1* | 3/2003 | Nishikawa | 370/352 |
| 2003/0169713 A1* | 9/2003 | Luo | 370/338 |
| 2003/0198196 A1* | 10/2003 | Bahl et al. | 370/311 |
| 2003/0200455 A1* | 10/2003 | Wu | 713/200 |
| 2004/0001470 A1* | 1/2004 | Chen | 370/338 |
| 2004/0082327 A1* | 4/2004 | Kim et al. | 455/435.2 |
| 2004/0090929 A1* | 5/2004 | Laux et al. | 370/311 |
| 2004/0103275 A1* | 5/2004 | Ji et al. | 713/150 |
| 2004/0240412 A1* | 12/2004 | Winget | 370/331 |
| 2004/0246922 A1* | 12/2004 | Ruan et al. | 370/331 |
| 2004/0253996 A1* | 12/2004 | Chen et al. | 455/574 |

FOREIGN PATENT DOCUMENTS

| | | |
|---|---|---|
| JP | 2002-541731 A1 | 12/2002 |
| JP | 2003-044288 | 2/2003 |
| JP | 2003-158481 | 5/2003 |
| WO | WO 00/60811 A1 | 10/2000 |

\* cited by examiner

WIRELESS WAKE-ON-LAN POWER MANAGEMENT

BACKGROUND OF THE INVENTION

The present invention relates to a computer or the like capable of external communication and, more particularly, to a computer or the like, capable of connecting to a wireless LAN.

Computers, typically, by notebook-type personal computers (notebook PCs) can be connected a network such as a LAN (local Area Network) by an interface device called a NIC (network interface card) or a LAN adaptor. Modems were first used as interfaces connected to networks and the present dominant interfaces connected to networks are wired communication interfaces such as Token-Ring and Ethernet (trademark). However, wireless LANs are preferable in terms of avoidance of troublesome cable wiring and are expected to come into widespread use in the future with the rapid development of notebook PCs, portable telephones, mobile terminals such as PDAs, etc.

In recent years, a need has arisen in some cases of automatic diagnosis or maintenance operation executed on a disk storage system or the like to power-on a PC provided with a service processor without intervention of an operator. Also, in a company for example, there is a need to perform, for example, simultaneous rewriting of programs in a multiplicity of PCs in a system for the purpose of reducing the total cost of the system including the maintenance cost. In such a situation, it is required that each PC be powered on without intervention of an operator. Wake-on-LAN therefore attracts attention as one of network management functions. Wake-on-LAN starts up a PC by sending a particular packet (magic packet) from a network. Wake-on-LAN enables a PC to be powered on according to an instruction which is provided from a network by an operation at a remote place instead of an operator's manual power-on operation.

A conventional art is known which uses a system in which wakeup information can be contained in a frame control channel (FCCH) in a medium access control (MAC) frame transmitted from an access point (AP) in a wireless LAN for the purpose of minimizing the power consumption in a mobile terminal (MT) in the wireless LAN, the mobile terminal entering a sleeping state when the wakeup information is not contained (see, for example, patent document 1).

Patent document 1

PC (WO) 2002-541731 (pages 7 to 11, FIGS. 2 to 4)

With the rapidly increasing prevalence of wireless LANs in recent years, there has been an increasing demand for implementing also in wireless LANs Wake-on-LAN realized in the wired Ethernet LAN. As a method for implementing Wake-on-LAN in a wireless LAN, a method using a power save mode specified in standards related to the international standard IEEE802.11 is conceivable. More specifically, the power save mode specified in IEEE802.11 is enabled in a client PC (station) in a Wake-on-LAN waiting state. In this power save mode, the client PC is in a sleeping mode for a time period (DTIM (Delivery Traffic Indication Map) interval) set under an agreement between the client PC and an access point. When the access point receives a data packet addressed to the client PC, it buffers the data packet. The client PC wakes up (exits from power save mode) and checks information in DTIM frames whether any data packet addressed to it was received when it was in the sleep mode. If a received data packet addressed to the client PC exists, the client PC obtains the data from the access point. If there is no received data packet addressed to the client PC, the client PC again enters the sleeping mode in the next DTIM interval.

Power consumption is a hindrance to the implementation of Wake-on-LAN in a wireless LAN. While the power consumption in a state of waiting for a Wake-on-LAN packet in the wired Ethernet LAN is about 100 mW, an amount of power 12 times higher than this, i.e., 1.2 W or more, is consumed in the case where the current wireless LAN is used. That is, while the power consumption in a wireless LAN adaptor at the time of reception of a wireless frame is 600 mW, the power consumption at the time of transmission is considerably large, 1.2 to 1.5W. This is because a low-noise amplifier for amplifying a wireless signal at the time of transmission consumes a large mount of power. When a wireless frame is transmitted in the Wake-on-LAN standby state, the power consumption largely exceeds 660 mW specified in the mini PC specifications. Also, a large load is imposed on a power subsystem in a PC main unit. There is a need to change the hardware in order to ensure withstanding against the peak power in the standby state.

Also, the client PC must associate with the access point before entering the power save mode. To perform this association, it is necessary for the client PC to transmit a wireless frame to the access point. That is, there is also a problem that the client PC must transmit various wireless frames to enable use in Wake-on-LAN of the power save mode in accordance with the above-mentioned IEEE 802.11 specifications.

Further, in order to enter the Wake-on-LAN standby mode, the client PC must first identify the access point from which it receives a magic packet. It is therefore necessary for the client PC to start scanning for finding the access point. If the access point is not found, it must periodically repeat scanning. For scanning for finding the access point, transmission of a wireless frame is also required and there is a need to reduce the power consumption at the time of transmission of the wireless frame.

The present invention has been achieved to solve the above-described technical programs, and a purpose of the present invention is to enable a power supply for a system in a computer connected to a wireless LAN to be turned on the basis of a signal from the wireless LAN side.

Another purpose of the present invention is to reduce the power consumption in a computer having the function of connecting to a wireless LAN.

Still another purpose of the present invention is to enable a computer having a wireless LAN function in accordance with the IEEE 802.11 related standards to receive a broadcast/multicast frame without performing handshaking with an access point.

SUMMARY OF THE INVENTION

A computer to which the present invention is applied to achieve the above-described purposes includes a system main unit, a receiving mechanism for receiving a broadcast frame and/or a multicast frame transmitted from a predetermined wireless access point in a state where a main power supply for the system main unit is not on, and a main power supply turning-on mechanism for turning on the main power supply for the system main unit on the basis of the broadcast frame and/or the multicast frame received by the receiving mechanism.

The computer may further include a determination mechanism for determining an access point on which frame monitoring should be performing among the access points scanned by a scanning mechanism. The receiving mechanism may monitor frames from the access point determined by the determination mechanism to receive the broadcast frame and/or the multicast frame. Also, the receiving mechanism may receive the broadcast frame and/or the multicast frame without performing handshaking with the predetermined wireless access point. Receiving the frame in this manner is preferable because the power consumption in the computer is reduced. Further, the receiving mechanism may stay in a sleep mode during the DTIM period, etc. according to an arrangement with the access point. After the passage of the time period, the receiving mechanism may receive a data packet addressed to the receiving mechanism. The power consumption is further reduced thereby.

A computer to which the present invention is applied in another aspect of the present invention includes a determination mechanism for determining in wireless access points a predetermined wireless access point to be monitored, a frame monitoring mechanism for enabling, on the basis of an IEEE802.11 related standard (802.11, 802.11a, 802.11 b or the like), monitoring of a frame broadcast or multicast from the predetermined wireless access point determined by the determination mechanism even in a situation where handshaking with the predetermined wireless access point is not performed, a determination mechanism for determining whether or not a magic packet exists in the frame monitored by the frame monitoring mechanism, and a main power supply turning-on mechanism for turning on a main power supply for the system if the determination mechanism determines that the magic packet exists. The frame monitoring mechanism may perform monitoring according to predetermined timing based on a predetermined power save setting.

A wireless access point to which the present invention is applied includes a receiving mechanism for receiving a signal for starting up a main power supply for a computer from a remote place via a network, and a wireless transmission mechanism for transmitting into the air a broadcast frame and/or a multicast frame including the signal received by the receiving mechanism. The wireless access point may further include a determination mechanism for determining permission/non-permission to transmit the frame including the signal received by the receiving mechanism, and a discard mechanism (or discard filter) for discarding the frame if the determination mechanism determines non-permission to transmit the frame. This arrangement is preferable because the security of wireless communication can be further improved.

This wireless transmission mechanism may transmit the broadcast frame and/or the multicast frame under an IEEE802.11 related standard. The wireless access point may further include a buffering mechanism for buffering the signal received by the receiving mechanism before a time according to DTIM (Delivery Traffic Indication Map) timing. This wireless transmission mechanism may transmit the broadcast frame and/or the multicast frame into the air at the time according to the DTIM timing.

If the present invention is grasped in the category of method, a method of powering-on via a wireless network to which the present invention applied includes a step of monitoring a broadcast frame and/or a multicast frame transmitted from wireless access points on the basis of a set condition and a condition for selection, a step of determining whether or not a powering-on signal is contained in the broadcast frame and/or the multicast frame monitored, and a step of sending to a system main unit the powering-on signal for turning on a main power supply for the system main unit if the powering-on signal is contained.

Another frame monitoring method to which the present invention is applied includes a step of determining in wireless access points a predetermined wireless access point to be monitored on the basis of information stored in a memory in advance, and a step of monitoring a frame broadcast or multicast from the predetermined wireless access point in a state in accordance with an IEEE802.11 related standard without performing handshaking with the predetermined wireless access point.

Further, a frame transmission method to which the present invention is applied includes a step of waiting for a wireless frame directed to the air, a step of obtaining a broadcast frame and/or a multicast frame, a step of determining whether a signal for turning on a main power supply for a predetermined station is contained in the broadcast frame and/or the multicast frame obtained, and a step of transmitting the broadcast frame and/or the multicast frame into the air according to predetermined timing if the signal for turning on the main power supply is contained.

The above-described computer and so on in accordance with the present invention can be grasped as a program formed so that a computer which performs communication by being connected to a predetermined wireless network can perform each function, and as a program formed so that a computer provided as an access point can perform each function. This program is provided in various forms to a computer. For example, the program may be provided in a state of being installed in a notebook computer. Also, the program to be executed by a computer may be provided by being stored on a storage medium so that the program is readable with the computer. For example, a DVD or a CD-ROM medium corresponds to this storage medium. The program is read with a DVD or CD-ROM reader or the like and is stored in a flash ROM or the like to be executed. Also, the program may be provided by a program transmitting device via a network.

A program to which the present invention is applied enables a computer to perform the function monitoring a broadcast frame and/or a multicast frame transmitted from wireless access points, the function of determining whether or not a powering-on signal is contained in the broadcast frame and/or the multicast frame monitored, and the function of sending to a system main unit the powering-on signal for turning on a main power supply for the system main unit if the powering-on signal is contained.

Another program to which the present invention is applied enables a computer to perform the function of determining in wireless access points a predetermined wireless access point to be monitored on the basis of information stored in a memory in advance, and the function of monitoring a frame broadcast or multicast from the predetermined wireless access point in a state in accordance with an IEEE802.11 related standard without performing handshaking with the predetermined wireless access point.

A still another program to which the present invention is applied enables a computer to perform the function of obtaining a broadcast frame and/or a multicast frame, the function of determining whether a signal for turning on a main power supply for a predetermined station is contained in the broadcast frame and/or the multicast frame obtained, and the function of transmitting the broadcast frame and/or the multicast frame into the air according to predetermined timing if the signal is contained.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
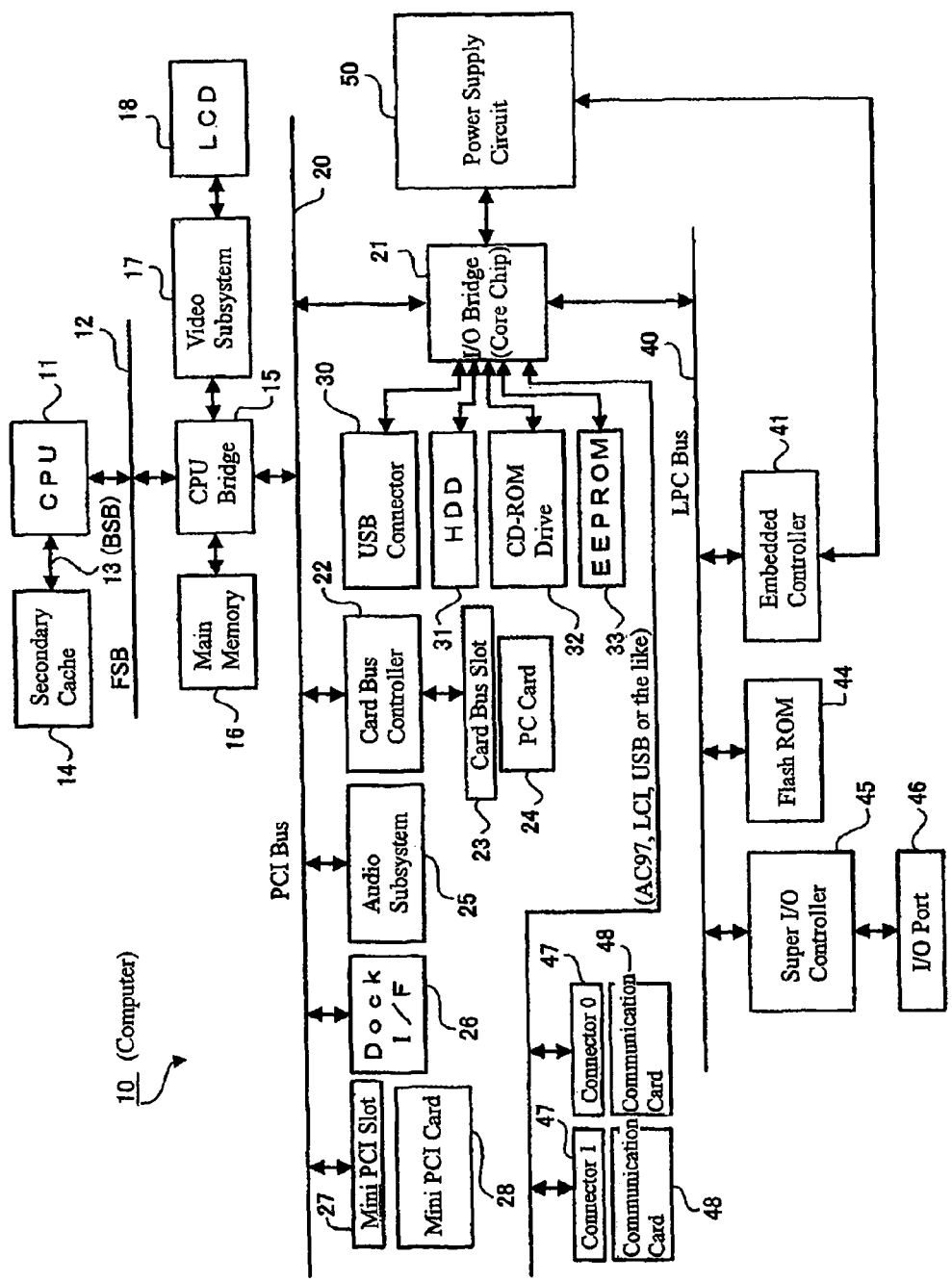
FIG. 1 is a diagram showing the hardware configuration of a computer such as a notebook PC.

Referring now more particularly to the accompanying drawings, in which like numerals indicate like elements or steps throughout the several views, FIG. 1 is a diagram showing the hardware configuration of a computer 10 such as a notebook PC (notebook-type personal computer). In the computer 10 shown in FIG. 1, a CPU 11 functions as a brain of the entire computer 10 and executes various problems under control of an OS. This CPU 11 is connected to components of the computer via buses in three stages, i.e., an FSB (front side bus) 12, which is a system bus, a PCI (Peripheral Component Interconnect) bus 20, which is a bus for high-speed I/D devices, and an LPC (Low Pin Count) bus 40, which is a new interface to be substituted for the ISA bus. The CPU 11 stores program codes and data in its cache memory to enable speedup of processing. A secondary cache 14 may be provided and connected to the CPU 11 via a special-purpose bus BSB (back side bus) 13 to compensate for a deficiency in the capacity of a primary cache provided in the CPU 11.

The FSB 12 and the PCI bus 20 are connected to each other by a CPU bridge (host-PCI bridge) 15 called a memory/PCI chip. This CPU bridge 15 has a memory controller function for controlling operations for access to a main memory 16 and includes a data buffer for absorbing the difference between the data transfer rates of the FSB 12 and the PCI bus 20. The main memory 16 is a writable memory used as an area to which a program executed by the CPU 11 is read or as an area to which data obtained as a result of processing performed by executing a program is written.

Programs executed by the CPU 11 include the OS, various drivers for hardware operation on peripheral devices, application programs for particular tasks, and firmware such as a BIOS (basic input/output system).

A video subsystem 17 is a subsystem for realizing functions relating to video and includes a video controller. The video controller performs processing according to a drawing instruction from the CPU 11, writes to a video memory drawing information obtained as result of the processing, reads out the drawing information from the memory, and outputs the drawing information as drawing data to a liquid crystal display (LCD) 18.

The PCI bus 20 is a bus capable of transferring data at a comparatively high rate. To the PCI bus 20 are respectively connected an I/O bridge 21, a card bus controller 22, an audio subsystem 25, a docking station interface (dock I/F) 26, a mini PCI connector (slot) 27. The card bus controller 22 is a special-purpose controller for directly connecting a bus signal from the PCI bus 20 to an interface connector (card bus) of the card bus slot 23. A PC card 24 can be inserted in the card bus slot 23. The docking station interface 26 is a piece of hardware for connecting a docking station (not shown) which is a device for function expansion of the computer 10. When the notebook PC is set on the docking station, various hardware elements connected to an internal bus of the docking station are connected to the PCI bus 20 through the docking station interface 26. A mini PCI card 28 incorporating a wireless LAN module in this embodiment is connected to the mini PCI connector 27. The mini PCI card 28 is an expansion card (board) capable of expansion in accordance with the mini PCI specifications. The mini PCI is a PCI standard for mobile use and described as an appendix to the PCI Rev.2.2. specifications. The mini PCI is equivalent in function to the full-spec PCI.

The I/O bridge 21 has the function of bridging the PCI bus 20 and the LPC bus 40. The I/O bridge 21 also has a DMA controller function, a programmable interrupt controller (PIC) function, a programmable interval timer (PIT) function, an IDE (integrated device electronics) interface function, a USB (universal serial bus) function and an SMB (system management bus) interface function, and incorporates a real-time clock (RTC). The DMA controller function is a function for executing data transfer between a peripheral device such as an FDD and the main memory 16 without intervention of the CPU 11. The PCI function is a function for executing a predetermined program (interrupt handler) in response to an interrupt request from a peripheral device. The PIT function is a function for generating a timer signal with a predetermined period. To the interface realized by the IDE interface function, an IDE hard disk drive (HDD) 31 is connected. Also, a CD-ROM drive 32 is ATAPI (AT attachment packet interface) connected to this interface. A type of IDE device such as a DVD (digital versatile disc) drive different from the CD-ROM drive 32 may be connected instead of the CD-ROM drive 32.

The I/O bridge 21 is provided with a USB port. This USB port is connected to a USB connector 30 provided, for example, in side wall portion of the main body of the notebook PC. Further, an EEPROM 33 is connected to the I/O bridge 21 via an SM bus. The EEPROM 33 is a memory for storing a password and a supervisor password registered by a user, information such as a product serial number, etc. The EEPROM 33 is an electrically rewritable nonvolatile memory for retaining information such as a password supervisor password, or product serial numbers registered by a user. A plurality of connectors 47 are connected to the I/O bridge 21 via an AC 97 (Audio CODEC '97) supporting a modem function, an LCI (LAN connect interface incorporated in a core chip as an interface with the Ethernet, a USB or the like. A communication card 48 can be connected to each of the plurality of connectors 47. Further, the I/O bridge 21 is connected to a power supply circuit 50. The power supply circuit 50 includes an AC adaptor, a battery, a battery switching circuit which charges the battery (secondary battery) and which switches between power supply lines from the AC adaptor and the battery, and a DC/DC converter which generates direct-current voltages of, for example, 5 V and 3.3 V used in the computer 10.

The LPC bus 40 is an interface standard for connection of a legacy device not having the ISA bus. To the LPC bus 40 are connected to an embedded controller 41, a flash ROM 44 and a super I/O controller 45. The LPC bus 40 is also used for connection of peripheral devices operating at a comparatively low rate, e.g., a keyboard/mouse controller. An I/O port 46 is connected the super I/O controller 45. The super I/O controller 45 controls drive of the FDD, parallel data input/output (PIO) through a parallel port and serial data input/output (SIO) through a serial port. The embedded controller 41 controls a keyboard not shown in the figure and is connected to the power supply circuit 50 to perform part of the power management functions by means of an incorporated power management controller.

Wake-on-LAN in which power-on is performed when only an instruction from a network is provided is divided into a first mode in which power rises from a power-off state and a second mode in which power rises automatically from a sleeping state. In this embodiment, power-on via a gate array logic provided in the core chip of the I/O bridge 21 corresponds to the first mode, and resumption from an energy saving state (low power state) via the embedded controller 41 and the I/O bridge 21 corresponds to the second mode. A voltage of AC 100 to 240 V is supplied to the AC adaptor constituting the power supply circuit 50 and is converted, for example, into DC 16 V by this AC adaptor. In the DC/DC converter, direct-current constant voltages including VCC1 of 12V, 2.5 V, 1.5 V and 5 V, VCC2 of 3.3 V and Vaux of 3.3 V provided as a auxiliary power supply are generated from the input 16 V direct-current voltage. Auxiliary power Vaux is supplied to the PCI bus 20 to enable automatic power-on. At this time, only auxiliary power Vaux is output from the DC/DC converter to sections other than the section for power supply control. VCC1 and VCC2 rise at a power switch turning-on stage.

Auxiliary power Vaux supplied to the PCI bus 20 is supplied to the mini PCI card 28 connected to the PCI bus 20. The mini PCI card 28 in this embodiment is arranged as a wireless LAN mini PCI module described below to recognize a magic packet obtained through the wireless LAN and to supply a signal for turning on the main power supply for the system main unit to the system main unit through a PME (power management event) which is a signal line of the PCI bus 20.

The PME signal output from the mini PCI card 28 is input, for example, to the gate array logic of the I/O bridge 21. An output from the gate array logic output as POWER ON to the DC/DC converter of the power supply circuit 50 to turn on the system main unit of the computer 10. In this embodiment, such mini PCI card 28 is mounted on the PC supporting Wake-on-LAN to enable power-on and booting of the computer 10 independently of the operation of the power switch.

On the other hand, rising (WAKE UP) from the energy saving state (low power state) is effected by the embedded controller 41. That is, when the embedded controller 41 receives the PME signal in the sleeping state or a soft-off state, it outputs an instruction for rising to the DC/DC converter of the power supply circuit 50 via the I/O bridge 21. The computer 10 can then resume operation in the normal state from the energy saving state.

Although I/O bridge 21 contains power management circuits which conform to, for example, ACPI, any of at least I/O bridge 21, embedded controller 41, and mini PCI card 28 (as LAN module 60) can be considered a power manager which is responsible for power management functions according to the present invention. Preferably, the components of the power manager are powered via auxiliary power while main system power is off.

Figure 2:
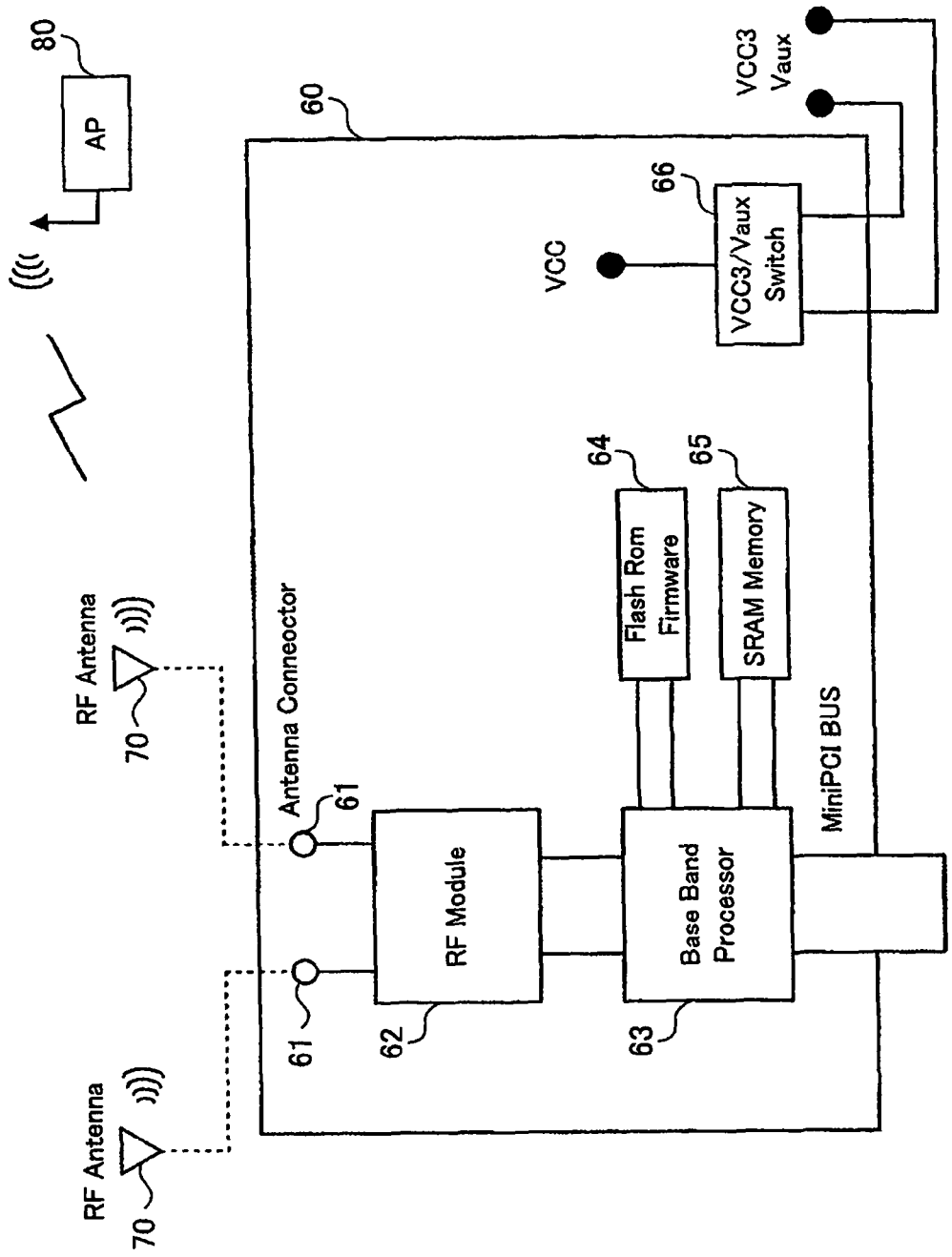
FIG. 2 is a diagram showing a wireless LAN mini PCI module to which this embodiment is applied.

FIG. 2 is a diagram showing a wireless LAN mini PCI module 60 to which this embodiment is applied. The wireless LAN mini PCI module 60 is used as one of mini PCI cards 28 which can be inserted in the mini PCI slot 27 shown in FIG. 1. The wireless LAN mini PCI module 60 is one of the components of a wireless LAN card in accordance with the mini PC standard. This wireless LAN mini PCI module 60 has an antenna connector 61, an RF (radio frequency) module 62, a baseband processor 63, a flash ROM 64, an SRAM 65, and a power switch 66.

The antenna connector 61 can be connected to an RF antenna 70 for performing wireless communication with an access point (AP) 80 in an environment where the notebook PC (computer 10) is placed. The RF antenna 70 can be arranged to enable propagation of an RF signal through a coaxial cable via an antenna connector not shown in the figure except when it is integrally combined with the wireless LAN card (wireless LAN mini PCI module 60). For example, the RF antenna 70 can be arranged in this manner to perform wireless communication with the access point 80, for example, by means of a diversity antenna or the like provided in the frame of the notebook PC.

The RF module 62 has a radio-frequency circuit for wireless communication supporting 2.4 GHz band wireless communication in the international standard IEEE802.11b and/or 5 GHz band wireless communication in the international standard IEEE802.11a. The baseband processor 63 has the MAC controller function interfacing with the CPU 11 in the MAC layer (Media Access Control) layer which is a low sublayer in accordance with a data link layer protocol, and enables communication with the access point 80 via the mini PCI bus under the control of the CPU 11. In the flash ROM 64, a program for executing processing for the power saving mode or the like in this embodiment is stored as firmware. In the SRAM 65, a magic packet of this station to be compared with a received broadcast frame and/or multicast frame (broadcast/multicast frame) is stored. The power switch 66 operates for switching between the power supply (VCC3) for the wireless LAN card and the auxiliary power supply (Vaux) according to an instruction from the baseband processor 63. The baseband processor 63 operates on the basis of the software stored in the flash ROM 64 to realize Wake-on-LAN in this embodiment on the basis of the information stored in the SRAM 65.

Figure 3:
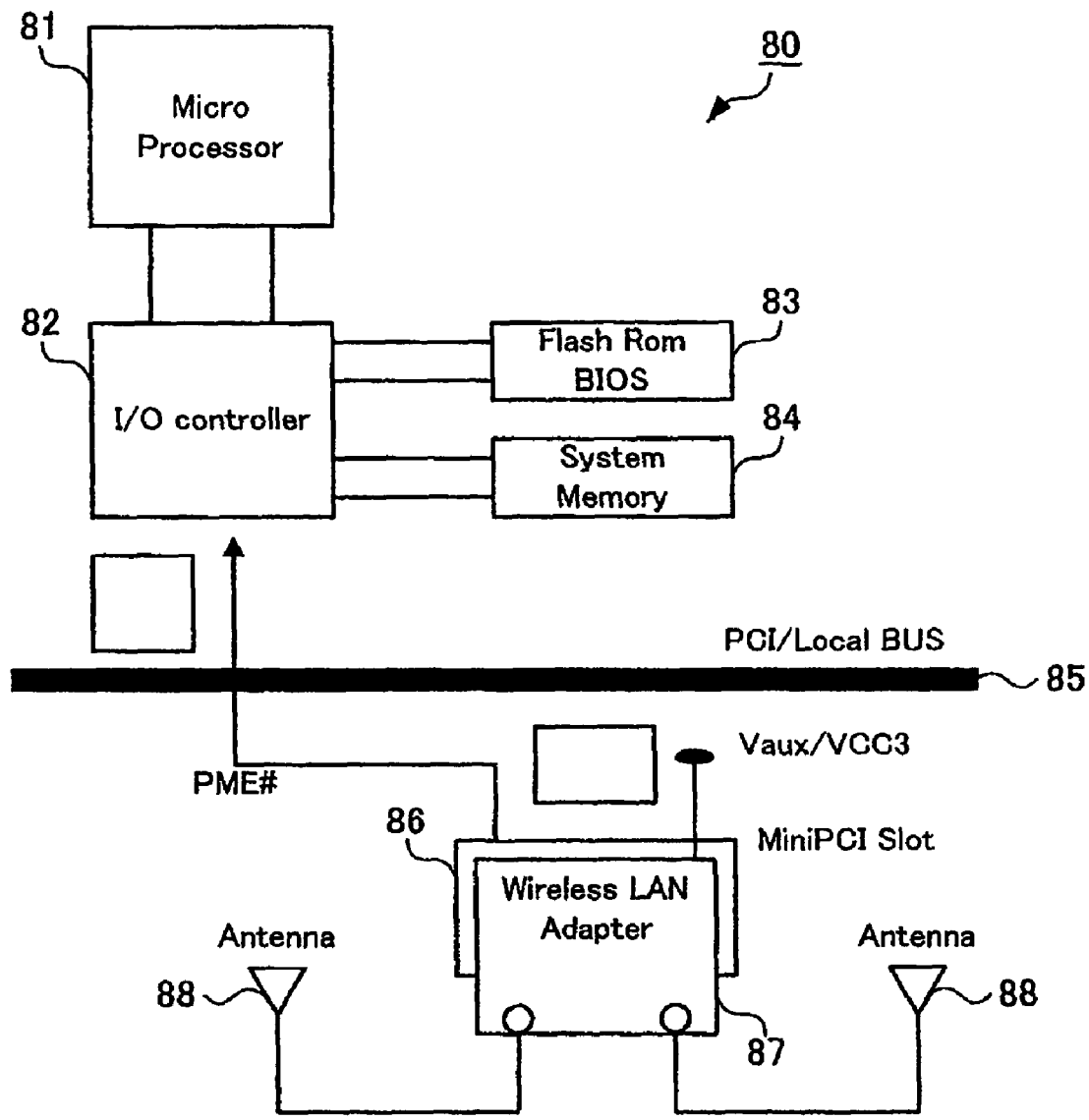
FIG. 3 is a block diagram showing the configuration of an access point to which this embodiment is applied.

FIG. 3 is a block diagram showing the configuration of the access point 80 to which this embodiment is applied. The access point 80 has a microprocessor 81 which executes broadcasting/multicasting processing in this embodiment, an I/O controller 82 which controls input/output of information, a flash ROM 83 in which a BIOS for controlling various devices connected is stored, and a system memory 84 in which various programs, information about an associating client (computer 10), etc., are stored. The access point 80 also has a mini PCI slot 86 connected via a PCI/local bus 85 to enable connection of a wireless LAN card (adaptor) 87 or the like. The wireless LAN card 87 is connected to an antenna 88 to realize Wake-on-LAN on the client computer 10 by means of the antenna 88.

The operation of the Wake-on-LAN powering on the system main unit of the computer 10 in the power-off state on the basis of a signal from the wireless LAN side (access point 80) will now be described.

In this embodiment, a power save mode for specialized use in Wake-on-LAN is provided without presupposing association. Ordinarily, according to 802.11, the computer 10 performs handshaking with the access point 80 by executing processes for authentication and association for exchange of information and functions to establish a connection to the access point 80. In this embodiment, such handshaking is not performed. The computer 10 does not perform handshaking but it adjusts its parameters to the access point 80 according to a beacon frame sent from the access point 80. This parameter setting enables reception of broadcast/multicast frames from the access point 80.

The computer 10 checks all broadcast/multicast frames sent from the access point 80, asserts the PME signal (#PME) if there is a magic packet addressed to this station, and turns on the main power supply for the system main unit. Also, the computer boots up according to a POST code setting in the BIOS. It is assumed that the access point 80 transmitting a "magic packet" transmits the "magic packet" not in a unicast frame but necessarily in a broadcast/multicast frame. Broadcasting is a method of sending data to an indefinite number of terminals without designating any data destination, and multicasting is a method of sending data to a plurality of destinations determined in advance. Unicasting is a method of one-to-one data communication designating only one message destination address. The magic packet is a predetermined protocol for power-on instruction from a LAN using the Wake-on-LAN function.

For transmission of a frame, an amount of power larger than is necessary for reception is required. The above-described method eliminates the need for transmitting any frame from the computer 10 and therefore realizes Wake-on-LAN at a low power consumption such as that when the auxiliary power supply (Vaux) is used. Also, since a handshaking process including association is not performed, a microcode for Wake-on-LAN (a ROM code for the wireless LAN adaptor) can be made smaller. Further, a process such as roaming is required once an association is established. However, the above-described method also eliminates the need for this process.

In the above-described method, it is necessary that the station, i.e., the computer 10, be in the receiving state at all times since broadcast/multicast frames are transmitted from the access point at arbitrary times. The computer 10 correspondingly consumes an amount of power. Several methods described below are conceivable as a means for coping with this unnecessary power consumption.

According to the first method, an option of processing broadcast/multicast frames by assuming that some of stations is in the power save mode regardless of whether or not at least one of the stations is actually in the power save mode is provided in the access point 80. If this processing is performed on the access point 80 side, the station computer 10 can be arranged to monitor (listen to) frames only at times corresponding to DTIM (Delivery Traffic Indication Map) intervals, as does the station in the power save mode. Waiting for a magic packet at a low power consumption in the standby state is made possible in this manner. This method ensures that the number of functions added to the access point 80 can be markedly reduced. This option switch can be can be remotely set and made effective only when necessary, so that the same performance as the current base station (access point 80) can be normally ensured.

In the second method, the access point 80 checks whether or not any "magic packet" exists in data with respect to broadcast/multicast frames, and, if a "magic packet" exists, the access point 80 transmits the frame as it does when a station (computer 10) in the power save mode exists. When a station in the power save mode exists, the access point 80 transmits broadcast/multicast frames at DTIM beacon intervals. If this processing is performed on the access point 80 side, the station computer 10 can be arranged to monitor (listen to) frames only at times corresponding to DTIM intervals and can be maintained in the standby state at a reduced power consumption.

As a function of the access point 80 to check a "magic packet" frame, an option described below can also be provided. That is, in addition to the above-described second method, a process is performed in which the access point 80 also checks whether or not any "magic packet" exists in data in unicast frames (directed MPDU (Message Protocol Data Unit) transfer) frames received by the access point 80, and transmits this data portion in broadcast frames at DTIM beacon intervals. In this manner, functions equivalent to those of the Wake-on-LAN in a wired LAN allowing transmission of a "magic packet" in unicast frames can be realized in the Wake-on-LAN in the wireless LAN having this optional function. As a further option, limitation of transmission of a "magic packet" into the air by the access point 80 is also possible. Of the access point 80, the network on the wireless side in contrast with the network on the wired side will be referred to as "air side".

With respect to the problem that the computer 10 consumes power by periodically repeating scanning for identifying the access point from which it receives a "magic packet", it is preferable to adopt an arrangement in which a channel in the access point 80 is manually set in a wireless profile for Wake-on-LAN. That is, to realize Wake-on-LAN, there is a need to input information including SSID (service Set Identification) and WEP (Wired Equivalent Privacy) through a BIOS setting on-screen display or the like. This setting is recorded in a memory (nonvolatile memory) in the wireless card. A channel in the access point 80 is added to this profile setting. If setting is made, it is not necessary for the station computer 10 to scan channels for searching for the access point 80, and the power consumption can be remarkably reduced.

Concrete processing in the above-described implementation of the wireless Wake-on-LAN in the IEEE802.11 group will be described below in detail with reference to flowcharts.

Figure 4:
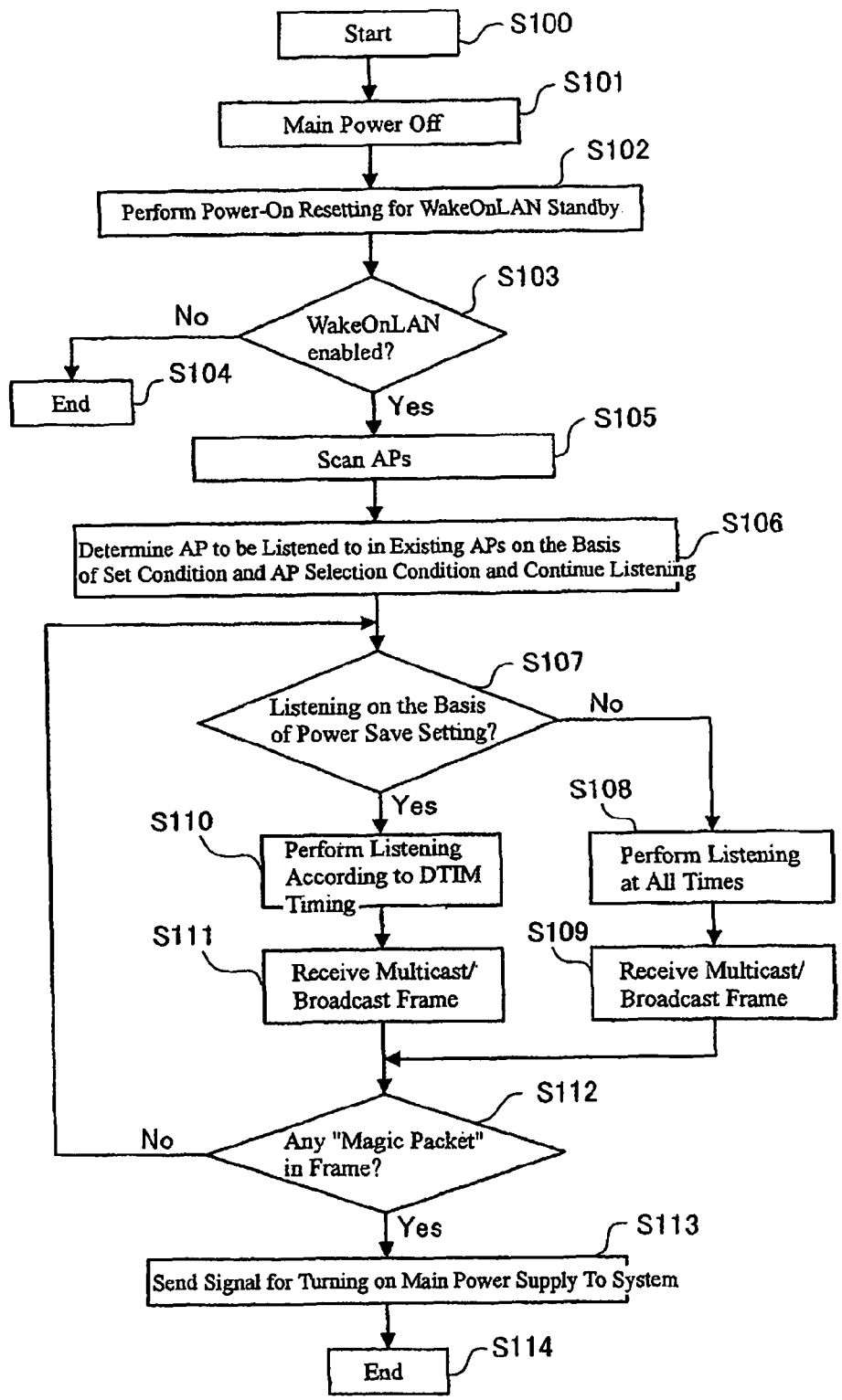
FIG. 4 is a flowchart showing wireless Wake-on-LAN processing in the station-side computer.

FIG. 4 is a flowchart showing wireless Wake-on-LAN processing in the computer 10 on the station side. Processing is started in step 100. As a prerequisite for starting this processing, the completion of predetermined settings is required. Settings in items shown below are made in the computer 10 by means of a DOS application program or the like.

1. SSID (0 to 32 bytes)
2. WEP key (5 or 13 bytes)
3. Enable/disable of the power save mode at the time of listening for wireless Wake-on-LAN (1 bit)
4. Enable/disable of use of SSID for limitation of AP (1 bit)
5. Enable/disable of use of WEP (1 bit)
6. Enable/disable of IEEE802.11 wireless Wake-on-LAN (WWOL) (1 bit)
7. Channel Number (1 byte)

These values are written to a memory on the wireless LAN mini PCI module 60 shown in FIG. 2, e.g., the SRAM 65 before wireless Wake-on-LAN standby by means of the above-mentioned application program. The values in the parentheses of the items shown above indicate the number of bytes in registers on the SRAM 65. Through these settings, the station-side computer 10 can limit networks and APs to be monitored (listened to) to a certain network and AP when it is in the wireless Wake-on-LAN standby state.

In step 101, the main power supply is turned off or the AC power supply (AC adapter) plug is inserted after execution or an ordinary computer operation, and auxiliary power (Vaux)

is applied to the wireless LAN adaptor card, i.e., the wireless LAN mini PCI module 60. Subsequently to this step 101, power-on-resetting for wireless Wake-on-LAN standby is performed in the 802.11 adaptor, i.e., the wireless LAN mini PCI module 60 (step 102). Thus, power-on resenting is performed as a prerequisite for processing in the flow shown in FIG. 4.

The baseband processor 63 determines on the basis of the Wake-on-LAN enable/disable information set in advance in the SRAM 65 whether the process should be terminated to avoid consumption of power by the adaptor (wireless LAN mini PCI module 60) or the computer should enter the wireless Wake-on-LAN standby state (step 103). If the wireless Wake-on-LAN is disabled, processing is terminated (step 104). If the wireless Wake-on-LAN is enabled and if the computer should enter the wireless Wake-on-LAN standby state, the process advances to step 105.

In step 105, access points (AP) are scanned. If this scanning is limited to certain scanning channels in advance, wasting of power for unnecessary channel scanning can be avoided. In such a case, checking of the existence/nonexistence of beacons in a particular channel (or two or three channels) in a short time suffices. Thereafter, the access point 80 to be monitored (listened to) in the plurality of existing access points (AP) is determined on the basis of the condition set in the SRAM 65 and a condition for selection of the access point 80 and monitoring (listening) is continued (step 106). The "condition for selection of the access point 80" is, for example, a setting of a microcode in the adaptor (wireless LAN mini PCI module 60) such that the access point 80 having a higher field strength is selected.

In step 107, determination is made on the basis of the power save mode setting stored in the SRAM 65 as to whether beacons should be monitored (listened to) at all times or according to DTIM timing. If the power save mode is set in the disabled state, frames are monitored (listened to) at all times (step 108) and only multicast/broadcast frames are received (step 109). If the power save mode is set in the enabled state, monitoring (listening) is performed only at times according to the DTIM timing (step 110). The power consumption in the case of receiving in a short time as in step 110 is much lower than that in the case of listening at all times as in step 108. After step 110, multicast/broadcast frames are received on the basis of the IEEE802.11 Power Save Station protocol in the wireless LAN mini PCI module 60 (step 111).

After step 109 or step 111, the baseband processor 63 checks whether any "magic packet" is contained in the received frame (step 112). If no "magic packet" is contained, the process returns to step 107 to repeat processing from step 107. If a "magic packet" is contained, the baseband processor 63 sends out a signal for turning on the main power supply for the system to the system main unit (step 113) to turn on the main power supply for the computer 10. The processing on the computer 10 side for executing wireless Wake-on-LAN performed as described above is completed (step 114).

Processing on the access point 80 side will next be described.

The access point 80 performs special processing on a magic packet to reduce the standby power for station-side computer 10 and to improve the security. In the access point 80, two setting items shown below are added to the access point setting.

1. Enable/disable of buffering performed before the DTIM timing with respect to a multicast/broadcast frame containing a "magic packet" to reduce the wireless Wake-on-LAN standby power on the station side (1 bit)

2. Enable/disable of transmission of a multicast/broadcast frame (1 bit). The frame is not transmitted if a "magic packet" is contained in the frame.

These settings are made in advance in the access point 80 by an administrator of the access point 80 and the information on these setting is stored, for example, in the flash ROM 83 or the like. If both the two settings are disabled, the state of the access point 80 is the same as that of an access point not having the wireless Wake-on-LAN functions. When the above-described function 1 is enabled, the station (computer 10) can receive multicast/broadcast frames by performing monitoring (listening) only at times at which DTIM is sent, thus, reducing the power consumption. When the above-described function 2 is disabled, transmission of a "magic packet" into the air from the access point 80 is limited to prevent occurrence of an unauthorized wireless LAN connection using a multicast/broadcast frame from the managed access point 80, thus improving the security function.

Figure 5:
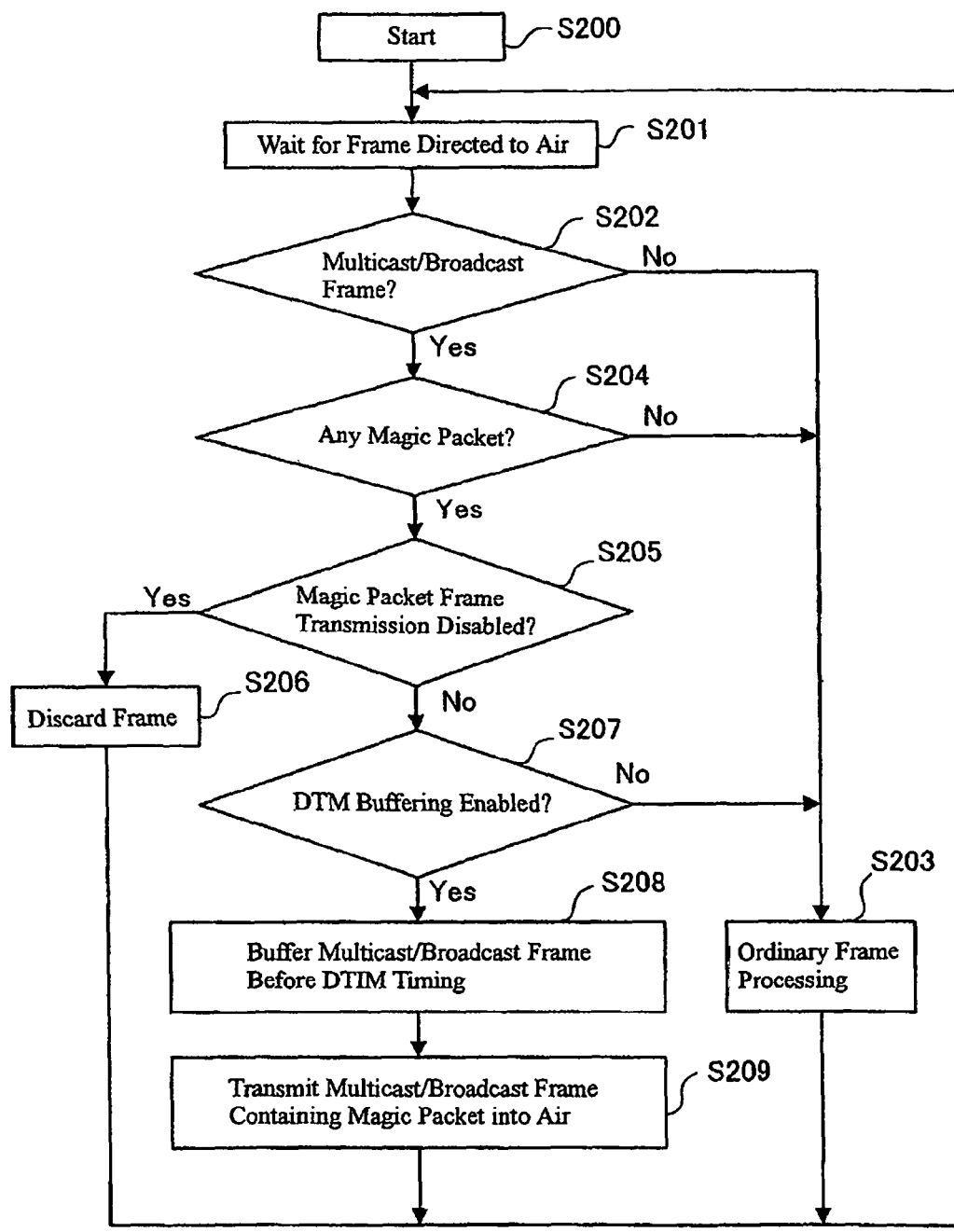
FIG. 5 is a flowchart showing processing on the access point side.

FIG. 5 is a flowchart showing processing on the access point 80 side. In the example of processing shown in FIG. 5, transmission of a "magic packet" into the air from the access point 80 is limited by the optional function of the access point 80. After the completion of the above-described settings in the access point 80, processing is started (step 200). A frame directed to the communication region "air" (BBS(Basic Service Set) of access point 80) is awaited (step 201). The microprocessor 81 in the access point 80 checks whether or not an obtained frame is a multicast/broadcast frame (step 202). If the obtained frame is not a multicast/broadcast frame, the ordinary frame processing is executed (step 203) and the process returns to step 201. If the obtained frame is a multicast/broadcast frame, the process advances to step 204.

In step 204, determination is made as to whether or not a magic packet exists in the frame. If no magic packet exists, the process moves to the above-mentioned step 203. If a magic packet exists, the process advances to step 205.

In step 205, determination is made as to whether or not transmission of the frame is disabled according to the above-described setting 2 in the flash ROM 83 for example. If transmission is disabled, the frame is discarded without being transmitted into the air (step 206) and the process returns to step 201. If transmission of the frame is enabled, the process proceeds to step 207.

In step 207, determination is made as to whether or not DTIM buffering is enabled according to the above-described setting 1 in the flash ROM 83 for example (step 207). That is, determination is made as to whether the multicast/broadcast frame should be immediately transmitted or buffered before the DTIM timing. If DTIM buffering is disabled, the ordinary frame processing for immediately transmitting the multicast/broadcast frame is performed (step 203) and the process returns to step 201. If DTIM buffering is enabled, the process advances to step 208 for DTIM processing.

In step 208, the microprocessor 81 buffers (stores) the multicast/broadcast frame containing a "magic packet", for example, in the system memory 84 of the access point 80 before the time according to the DTIM timing comes. If a multicast/broadcast frame not yet transmitted exists in the access point 80 at the time according the DTIM timing, the multicast/broadcast frame containing a "magic packet" is transmitted into the air (step 209). The process then moves to step 201 for waiting for the next frame and the above-described processing is repeated. Frame processing is executed on the access point 80 side as described above.

The power save mode specified in IEEE802.11 may be enabled in the computer 10 in the Wake-on-LAN standby state to also reduce the power consumption. In such a case, the access point 80 first waits for an association request from the client (station) computer 10. The access point 80 makes effective power-save broadcasting only when the client associates with the access point 80 and makes a request for the power save mode. If data addressed to the client is received during the DTIM interval, the access point 80 stores the data in the system memory 84 for example, and informs the client of the existence of the stored data by power-save broadcasting at the next time according to the DTIM timing. The client starting up by the DTIM timing knows that the data has been received through power-save broadcasting. Transfer of the data is then started.

Figure 6:
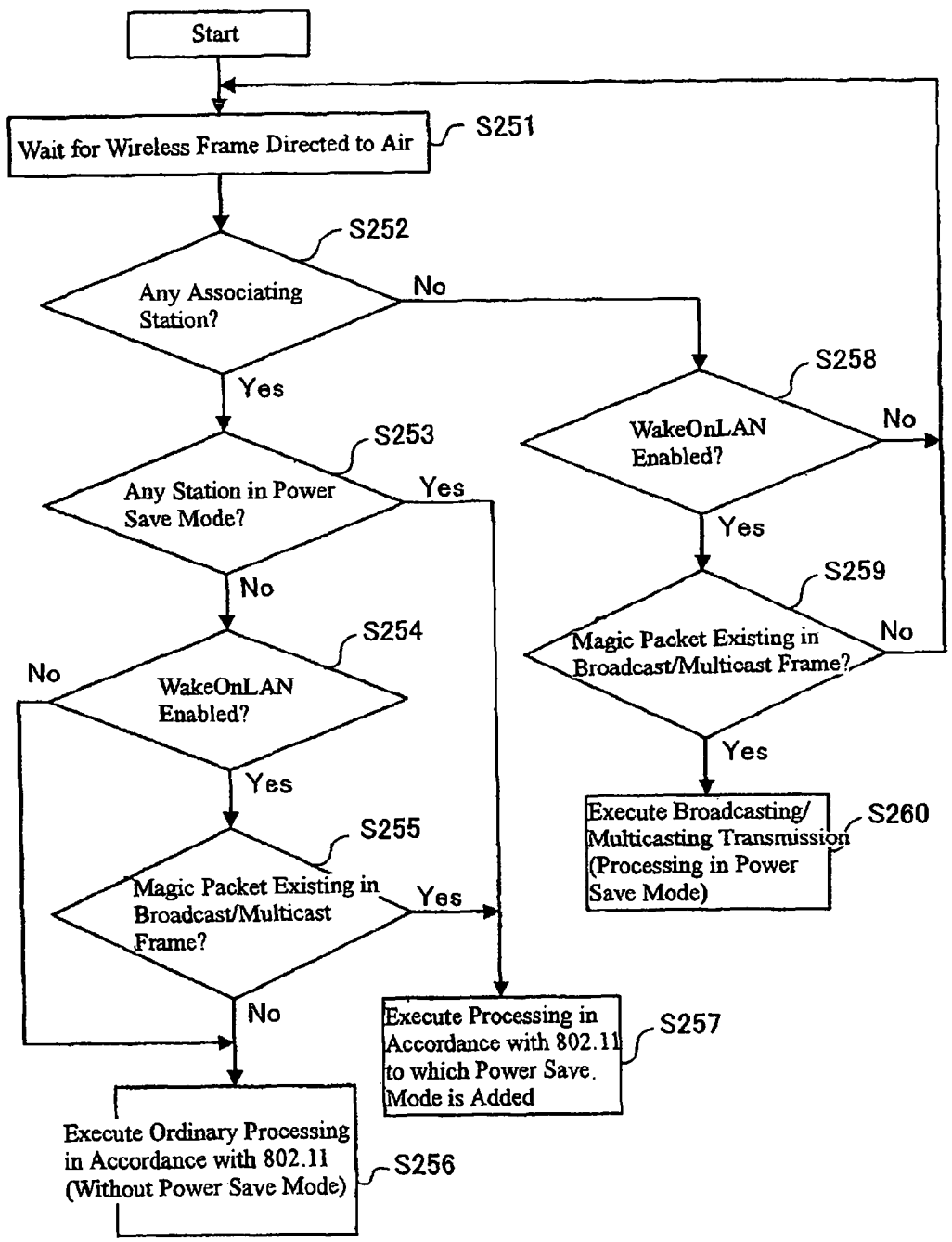
FIG. 6 is a flowchart showing processing for realizing wireless Wake-on-LAN in the access point.

FIG. 6 is a flowchart showing processing for realizing wireless Wake-on-LAN in the access point 80. The flow of processing specialized for wireless Wake-on-LAN will be again described in detail using FIG. 6 to facilitate understanding of this embodiment, although the description made below overlaps the description made with reference to the flowchart of FIG. 5.

As shown in the flowchart of FIG. 6, the access point 80 first waits for a wireless frame directed to the air (step 251). The access point 80 thereafter determines whether or not any station (computer 10) which has associated with the access point 80 exists. If no client has associated, the process moves to step 258. If a client has associated, determination is made as to whether or not any station in the power save mode exists (step 253). If a station in the power save mode exists, the power save mode specified in IEEE802.11 is executed (step 257). If no station in the power save mode exists in step 253, determination is made as to whether or not Wake-on-LAN is enabled (step 254). If Wake-on-LAN is not enabled, the ordinary processing in accordance with IEEE802.11 without the power save mode is executed (step 256). If Wake-on-LAN is enabled in step 254, determination is made as to whether or not a magic packet exists in a broadcast/multicast frame (step 255). If no magic packet exists, the processing in step 256; i.e., the ordinary processing in accordance with IEEE802.11 without the power save mode, is executed. If a magic packet exists, the processing in step 257, i.e., the power save mode specified in IEEE802.11, is executed.

If there is no associating station when the process returns to step 252, determination is made as to whether Wake-on-LAN is enabled (step 258). If Wake-on-LAN is not enabled, the process returns to step 251. If Wake-on-LAN is enabled, that is, the Wake-on-LAN switch is effective, determination is made as to whether or not a magic packet exists in a broadcast/multicast frame (step 259). If no magic packet exists, the process returns to step 251. If a magic packet exists, transmission of the broadcast/multicast frame is executed (step 260). If processing in the power-save mode is performed in steps 258 to 260, a magic packet is awaited during the DTIM period. If a magic packet is received at the access point 80 during the DTIM period through the broadcast/multicast frame, the access point 80 buffers the magic packet in the system memory 84 or the like. Also, the access point 80 informs the computer 10 of the reception of the magic packet by broadcasting/multicasting transmission at the next time according to the DTIM timing. If this power save mode processing is executed, it is not necessary for the computer 10 to be in the receiving state at all times, and the computer 10 may monitor frames only during the DTIM period, thus enabling waiting in the standby state at a reduced power consumption.

In the processing shown in FIG. 6, as described above, wireless Wake-on-LAN can be realized, for example, even in a case where wireless Wake-on-LAN is not originally implemented in the access point 80. That is, if a particular PC is set as a station in the power save mode in accordance with the flow of step 251 → step 252 → step 253 → step 257 show in FIG. 6, power-saving wireless Wake-on-LAN can be realized in association with any of existing access points such as those placed in stations, etc. In applications other than that to wireless Wake-on-LAN, the same access points as the existing access points can be used in association with ubiquitous devices such as potable telephones.

Description will be made of a function added by the BIOS.

Conventionally, Wake-on-LAN from a network adaptor can be enabled/disabled by a BIOS. This conventional setting is based on the assumption that it is made only from a wired network adaptor. When the wireless Wake-on-LAN using a wireless LAN according to this embodiment is used, there is a need to separately set the wired Wake-on-LAN and the wireless Wake-on-LAN from the viewpoint of security. The security of the wireless LAN and the security of the wired LAN are handled separately from each other for the purpose of strengthen the security of a user not using Wake-on-LAN based on the wireless LAN. Conventionally, the Wake-on-LAN enable/disable function and the function of enabling/disabling updating (Flash Over LAN) of a BIOS are set through the entire network card. In the Wake-on-LAN based on the wireless LAN to which this embodiment is applied, enable/disable settings are respectively made in the Wake-on-LAN and the Flash Over LAN for specialized use with the wireless LAN separately from the enable/disable setting in the conventional wired LAN.

Figure 7:
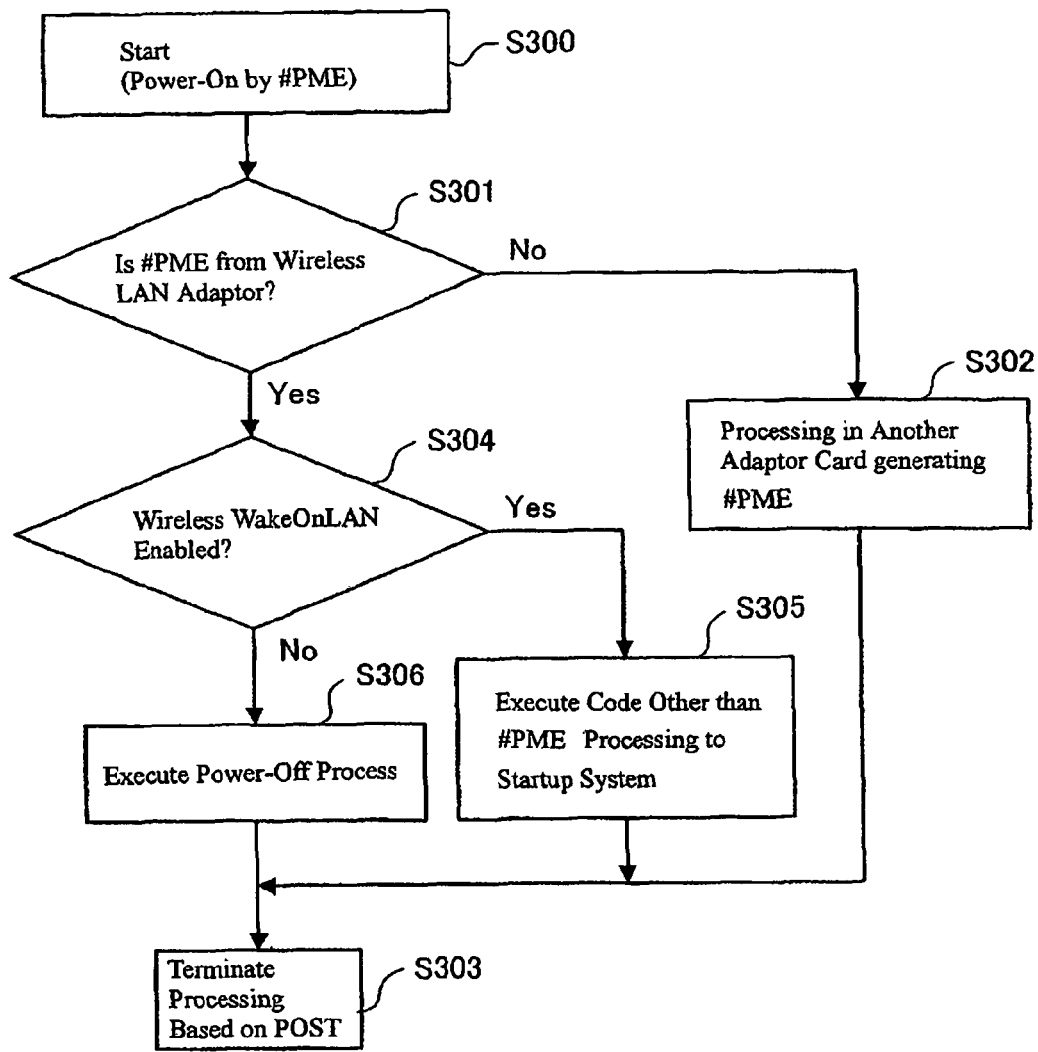
FIG. 7 is a diagram showing the procedure of wireless Wake-on-LAN processing in POST (Power-On Self Test).

FIG. 7 is a diagram showing the procedure of wireless Wake-on-LAN processing in POST (Power-On Self Test). POST is a test program executed by the BIOS at the time of initialization of each piece of hardware when the system power supply is turned on.

First, step 300 represents entry of power-up processing at the time of power-on by PME signal (#PME).

In step 301, whether or not #PME is from the wireless LAN mini PCI module 60 provided as a wireless LAN adaptor is checked. If #PME is from the wireless LAN adaptor, the process advances to step 304. If #PME is not from the wireless LAN adaptor, processing in another adaptor card generating #PME is executed (step 302) and processing based on POST is terminated (step 303).

In step 304, the setting on the EEPROM 33 on the other board in which BIOS data is held is referred to check whether wireless Wake-on-LAN based on the wireless LAN is enabled or disabled. If the wireless Wake-on-LAN is enabled, processing based on POST is continued and the process moves to step 305. If the wireless Wake-on-LAN is disabled, the process proceeds to step 306. In step 305, a code other #PME processing is executed to startup the system, thereby terminating processing based on POST (step 303). In step 306, a power-off process is executed, thereby terminating processing based on POST (step 303).

Thus, this embodiment is arranged from the viewpoint of security so that #PME can be turned on/off for Wake-on-LAN. Processing such as shown in FIG. 7 enables a process in the wired mode and a process in the wireless mode separated from each other can be performed in such a manner that a startup is effected at the time acceptance of Wake-on-LAN in the wired mode but a startup is not effected at the time of acceptance of Wake-on-LAN in the wireless mode, thereby further improving the security.

As described above, in the case of ordinary processing in accordance with IEEE802.11, it is necessary for the station computer 10 to perform handshaking with the access point 80 by executing processes for authentication and association for connection to the access point 80. For association, transmission of a packet is required. While the maximum of the Vaux output in the mini PCI is 660 mW, a large amount of power of about 1200 mW is required at the time of wireless LAN transmission. When a packet is transmitted, the maximum power consumption specified in the mini PCI with respect to Vaux is exceeded. According to this embodiment, each station receives a broadcast/multicast frame from the access point without performing handshaking using authentication and association as a prerequisite for reception. If a magic packet frame addressed to the station exists in the broadcast/multicast frames, the station asserts "PME and turns on the main power supply, thus realizing Wake-on-LAN while reducing the power consumption.

Methods in which an ordinary client scans channels to identify the access point 80 includes an active scan method in which the client performs scanning by sending a signal by itself and a passive scan method in which the client performs scanning by obtaining a beacon frame sent over a certain channel without probing by itself. For example, in the case of active scan, about 1.2 W of power is required for scanning and the above mentioned 660 mW is exceeded. On the other hand, in the case of passive scan, it is necessary to perform monitoring for a long time and the average amount of power required for scanning is considerably large, for example, about 310 mW/sec. In this embodiment, therefore, a setting in a necessary setting item is made in advance at the time of setting SSID and WEP for identification of the access point. That is, selection from channels is added to BIOS setup, in other words, channels are in advance reduced to enable determination of the access point 80 at a power consumption of about several ten milliwatts. For example, a power-on operation for Wake-on-LAN or the like in particular is different from ordinary user operations. Therefore, it is easily to determine a channel in advance as described above. Even if this method is not specialized for an application to Wake-on-LAN, it is also advantageous from the viewpoint of security for example to set access point conditions in advance.

In the drawings and specifications there has been set forth a preferred embodiment of the invention and, although specific terms are used, the description thus given uses terminology in a generic and descriptive sense only and not for purposes of limitation.

We claim as our invention:

1. An apparatus comprising:
a wireless receiver that receives a beacon frame transmitted from a wireless access point when a main power supply for a system main unit coupled to the wireless receiver is not on;
the wireless receiver to set at least one parameter of the wireless receiver in response to receiving the beacon frame from the wireless access point, wherein the setting of the at least one parameter enables reception by the wireless receiver of a predetermined frame from the wireless access point without the wireless receiver transmitting a wireless frame to the wireless access point to handshake with the wireless access point, and wherein the predetermined frame is selected from the group consisting of a broadcast frame and a multicast frame;
the wireless receiver enabled by the setting of the at least one parameter to receive the predetermined frame from the wireless access point and to determine whether a magic packet addressed to the wireless receiver exists in the predetermined frame; and
the wireless receiver to supply a signal for turning on the main power supply for said system main unit to the system main unit if the magic packet exists in the predetermined frame.

2. The apparatus of claim 1, the wireless receiver further enabled by the setting of the at least one parameter to periodically consume power to monitor for the predetermined frame from the wireless access point and to otherwise stay in a sleep mode in a reduced power consumption state according to a specified interval timing.

3. The apparatus of claim 2, wherein the specified interval timing corresponds to a specified interval timing of broadcasting of the predetermined frame by the wireless access point.

4. The apparatus of claim 2, wherein the specified interval timing is a delivery traffic indication map timing.

5. The apparatus of claim 3, wherein the wireless receiver periodically monitors by scanning a subset of at least one scanning channel of a larger plurality of channels.

6. The apparatus of claim 5, wherein the wireless receiver determines the wireless access point and the subset of the at least one scanning channel by analyzing a service set identification and a wired equivalent privacy key stored in a wireless profile of the apparatus.

7. The apparatus of claim 2, wherein the magic packet is a predetermined protocol for power-on instruction from a LAN using a wake-on-LAN function.

8. The apparatus of claim 3, the wireless access point further to receive a frame directed to a basic service set communication region of the access point and determine if the received basic service set communication region frame is the predetermined frame;
if determined that the received basic service set communication region frame is the predetermined frame, the wireless access to determine if the magic packet exists in the predetermined frame;
if determined that the magic packet exists in the predetermined frame, the wireless access point to determine if transmission of the predetermined frame is enabled;
if determined that the transmission of the predetermined frame is enabled, the wireless access point to determine if the specified interval timing is enabled; and
if determined that the specified interval timing is enabled, the wireless access point to buffer the predetermined frame and transmit the buffered predetermined frame into the air on the subset of the at least one scanning channel when the wireless receiver periodically monitors for the predetermined frame from the wireless access point pursuant to the specified interval timing.

9. The apparatus of claim 8, the wireless access point to further check whether or not the magic packet exists in data in a unicast frame received by the access point; and
transmit the unicast frame data in a broadcast frame into the air pursuant to the specified interval timing if the magic packet exists in the unicast data.

10. A method for managing wireless communication between a receiver and an access point, comprising:
receiving a beacon frame transmitted from a wireless access point when a main power supply for a system main unit coupled to a wireless receiver is not on;
setting at least one parameter of the wireless receiver in response to receiving the beacon frame from the wireless access point;
setting of the at least one parameter enabling reception by the wireless receiver of a predetermined frame from the wireless access point without requiring the wireless receiver to transmit a wireless frame to the wireless access point to handshake with the wireless access point, and wherein the predetermined frame is selected from the group consisting of a broadcast frame and a multicast frame;

the wireless receiver enabled by the setting of the at least one parameter receiving the predetermined frame from the wireless access point and determining whether a magic packet addressed to the wireless receiver exists in the predetermined frame; and the wireless receiver supplying a signal for turning on the main power supply for said system main unit to the system main unit if determined that the magic packet exists in the predetermined frame.

11. The method of claim 10, further comprising:

enabling the wireless receiver by the setting of the at least one parameter to periodically consume power to monitor for the predetermined frame from the wireless access point and to otherwise stay in a sleep mode in a reduced power consumption state according to a specified interval timing; and the specified interval timing corresponding to a specified interval timing of broadcasting of the predetermined frame by the wireless access point.

12. The method of claim 11, wherein the specified interval timing is a delivery traffic indication map timing.

13. The method of claim 11, further comprising:

determining the wireless access point and a subset of the at least one scanning channel of a larger plurality of channels by analyzing a service set identification and a wired equivalent privacy key stored in a wireless profile of the apparatus; and monitoring for the predetermined frame by scanning the subset of the at least one scanning channel.

14. The method of claim 11, further comprising the wireless access point:

receiving a frame directed to a basic' service set communication region of the access point and determining if the received basic service set communication region frame is the predetermined frame;

if determined that the received basic service set communication region frame is the predetermined frame, determining if the magic packet exists in the predetermined frame;

if determined that the magic packet exists in the predetermined frame, determining if transmission of the predetermined frame is enabled;

if determined that the transmission of the predetermined frame is enabled, determining if the specified interval timing is enabled; and if determined that the specified interval timing is enabled, buffering the predetermined frame and transmitting the buffered predetermined frame into the air on the subset of the at least one scanning channel when the wireless receiver periodically monitors for the predetermined frame from the wireless access point pursuant to the specified interval timing.

15. The method of claim 14, further comprising the wireless access point:

checking whether or not the magic packet exists in data in a unicast frame received by the access point; and transmitting the unicast frame data in a broadcast frame into the air pursuant to the specified interval timing if the magic packet exists in the unicast data.

16. A computer program product for managing wireless communication between a receiver and an access point, the computer program product comprising:

a computer readable storage medium having computer readable program code embodied therewith, the computer readable program code comprising:

computer readable program code configured to:

receive a beacon frame transmitted from a wireless access point when a main power supply for a system main unit coupled to a wireless receiver is not on;

set at least one parameter of the wireless receiver in response to the received beacon frame to enable reception by the wireless receiver of a predetermined frame from the wireless access point without requiring the wireless receiver to transmit a wireless frame to the wireless access point to handshake with the wireless access point, and wherein the predetermined frame is selected from the group consisting of a broadcast frame and a multicast frame;

enable the wireless receiver by the setting of the at least one parameter to receive the predetermined frame from the wireless access point and determine whether a magic packet addressed to the wireless receiver exists in the predetermined frame; and supply a signal for turning on the main power supply for said system main unit to the system main unit if determined that the magic packet exists in the predetermined frame.

17. The computer program product of claim 16, the computer readable program code further configured to:

enable the wireless receiver by the setting of the at least one parameter to periodically consume power to monitor for the predetermined frame from the wireless access point and to otherwise stay in a sleep mode in a reduced power consumption state according to a specified interval timing, the specified interval timing corresponding to a specified interval timing of broadcasting of the predetermined frame by the wireless access point.

18. The computer program product of claim 17, wherein the specified interval timing is a delivery traffic indication map timing.

19. The computer program product of claim 17, the computer readable program code further configured to:

determine the wireless access point and a subset of the at least one scanning channel of a larger plurality of channels by analyzing a service set identification and a wired equivalent privacy key stored in a wireless profile of the apparatus; and monitor for the predetermined frame by scanning the subset of the at least one scanning channel.

20. The computer program product of claim 17, the computer readable program code further configured to cause the wireless access point to:

receive a frame directed to a basic service set communication region of the access point and determine if the received basic service set communication region frame is the predetermined frame if determined that the received basic service set communication region frame is the predetermined frame, determine if the magic packet exists in the predetermined frame;

if determined that the magic packet exists in the predetermined frame, determine if transmission of the predetermined frame is enabled;

if determined that the transmission of the predetermined frame is enabled, determine if the specified interval timing is enabled; and if determined that the specified interval timing is enabled, buffer the predetermined frame and transmit the buffered predetermined frame into the air on the subset of the at least one scanning channel when the wireless receiver periodically monitors for the predetermined frame from the wireless access point pursuant to the specified interval timing.

21. The computer program product of claim 20, the computer readable program code further configured to cause the wireless access point to:

check whether or not the magic packet exists in data in a unicast frame received by the access point; and transmit the unicast frame data in a broadcast frame into the air pursuant to the specified interval timing if the magic packet exists in the unicast data.

* * * * *